US005215356A

United States Patent [19]

Lin

[11] Patent Number: 5,215,356

[45] Date of Patent: Jun. 1, 1993

[54] WHEEL ASSEMBLY FOR A BABY CARRIAGE

[76] Inventor: Kuo-Liang Lin, No. 333, Cheng Kung Road, Tainan, Taiwan

[21] Appl. No.: 963,545

[22] Filed: Oct. 20, 1992

[51] Int. Cl.[5] ........................ B60B 27/00; B60B 37/00

[52] U.S. Cl. ................................ 301/111; 301/108.1; 301/119; 280/47.38; 16/30

[58] Field of Search ............... 280/47.18, 47.38, 47.41, 280/650, 658; 301/37.35, 37.36, 108.1, 111, 112, 118, 119, 120, 121, 122; 16/30, 38, 39

[56] References Cited

U.S. PATENT DOCUMENTS

| | | | |
|---|---|---|---|
| 774,150 | 11/1904 | Berry | 301/118 |
| 2,226,098 | 12/1940 | Hedstrom | 301/108.1 X |
| 2,576,683 | 11/1951 | Horn | 301/108.1 |
| 2,615,759 | 10/1952 | Becker | 301/112 |
| 2,778,159 | 1/1957 | Irwin | 301/112 X |

FOREIGN PATENT DOCUMENTS

| | | | |
|---|---|---|---|
| 0145807 | 6/1985 | European Pat. Off. | 301/119 |
| 3811757 | 10/1989 | Fed. Rep. of Germany | 301/111 |
| 7512365 | 4/1976 | Netherlands | 301/112 |

*Primary Examiner*—Brian Johnson

*Attorney, Agent, or Firm*—Morton J. Rosenberg; David I. Klein

[57] ABSTRACT

A wheel assembly for a baby carriage is provided comprising two wheels mounted on opposing ends of a shaft supported by a shaft holder fixed at an end of a supporting rod of a baby carriage. The shaft is coupled to the two wheels and a combining disc is secured to the shaft by small projections inserted within an annular groove formed in the shaft. A cap covers a recessed aperture of each wheel and is pressed inwardly to compress the combining disc for disengagement of the combining disc from the shaft and the wheel from the shaft.

1 Claim, 4 Drawing Sheets

WHEEL ASSEMBLY FOR A BABY CARRIAGE

BACKGROUND OF THE INVENTION

1. Field of the Invention

This invention pertains to wheel assemblies for baby carriages.

2. Prior Art

A conventional or prior art wheel assembly for baby carriages is shown in FIGS. 4–6 and includes a wheel assembly consisting of two wheels 8, 8' supported on a shaft holder 9 which is fixed pivotally at one end of a supporting rod 10. A shaft 7 is inserted through the wheels 8, 8' and the shaft holder 9 between both wheels 8, 8' and then is inserted through a combining disc 72 which has an engaging groove 71 for a pulling ring 73 insert for preventing removal of the wheel 8. A cap 74 is provided to enclose and cover the assemblage.

The prior art wheels 8, 8' may be assembled or disassembled by means of the pulling ring 73 engaging the groove 71 or being pressed down to prevent disengagement from the groove 71.

However, this conventional or prior art wheel assembly is considered to have the following disadvantages:

1. Such prior art wheel assemblies have a plurality of complicated component combinations such as a combining disc having a cylindrical portion 75 and an annular hook 76 as well as wheels having ridges 77 which increases the cost for these structures.

2. In such prior art structures, the pulling ring and the shaft are made of metal which is liable to rust owing to an extended period of use in an external environment or to a defective original anti-rust treatment which results in the pulling ring being operatively defective causing difficulty in disassembling the wheel.

3. Provision of the combining disc dictates that the shaft holes of the two wheels are of different size, which results in higher manufacturing costs.

SUMMARY OF THE INVENTION

This invention has been devised to improve the conventional wheel assembly for a baby carriage.

The wheel assembly for a baby carriage in the present invention includes a combining disc having hooks to engage grooves in a wheel to combine with the wheel and small projections on pressing studs to fit in an annular groove of a shaft to combine with the shaft. A cap is provided having hooks to engage inserting holes of the wheel to combine with the wheel and an inner surface being contiguous with the top end of the pressing studs of the combining disc so that the cap can be pressed inward to compress the pressing studs downwardly for disengagement of the small projections from the annular groove of the shaft so that the combining disc can be disassembled from the shaft and the wheel. A pair of wheels are combined with both ends of the shaft and, a shaft having an annular groove at one end and a large round head at the other end is insertable through the wheels. A shaft holder rotatably mounts the shaft between the two wheels and is fixed at a bottom end of a supporting rod of a baby carriage.

The wheel assembly of the present invention has the following advantages:

1. It is simplified in its element combination to reduce manufacturing costs.

2. The combining disc is formed of a non-metallic composition to prevent it from rusting.

3. The combining disc is combined with the wheel by means of hooks engaging grooves in the wheel, as opposed to the conventional wheel assembly wherein the combining disc is combined with the shaft and consequently in the present invention both wheels are structured the same, resulting in reduced manufacturing costs.

4. The wheels can be removed by pressing the closing cap without necessity of any tool usage which facilitates assembling and disassembling procedures.

5. Its easy disassembling characteristics reduces costs in packaging and transportation.

DESCRIPTION OF THE PREFERRED EMBODIMENTS

Figure 1:
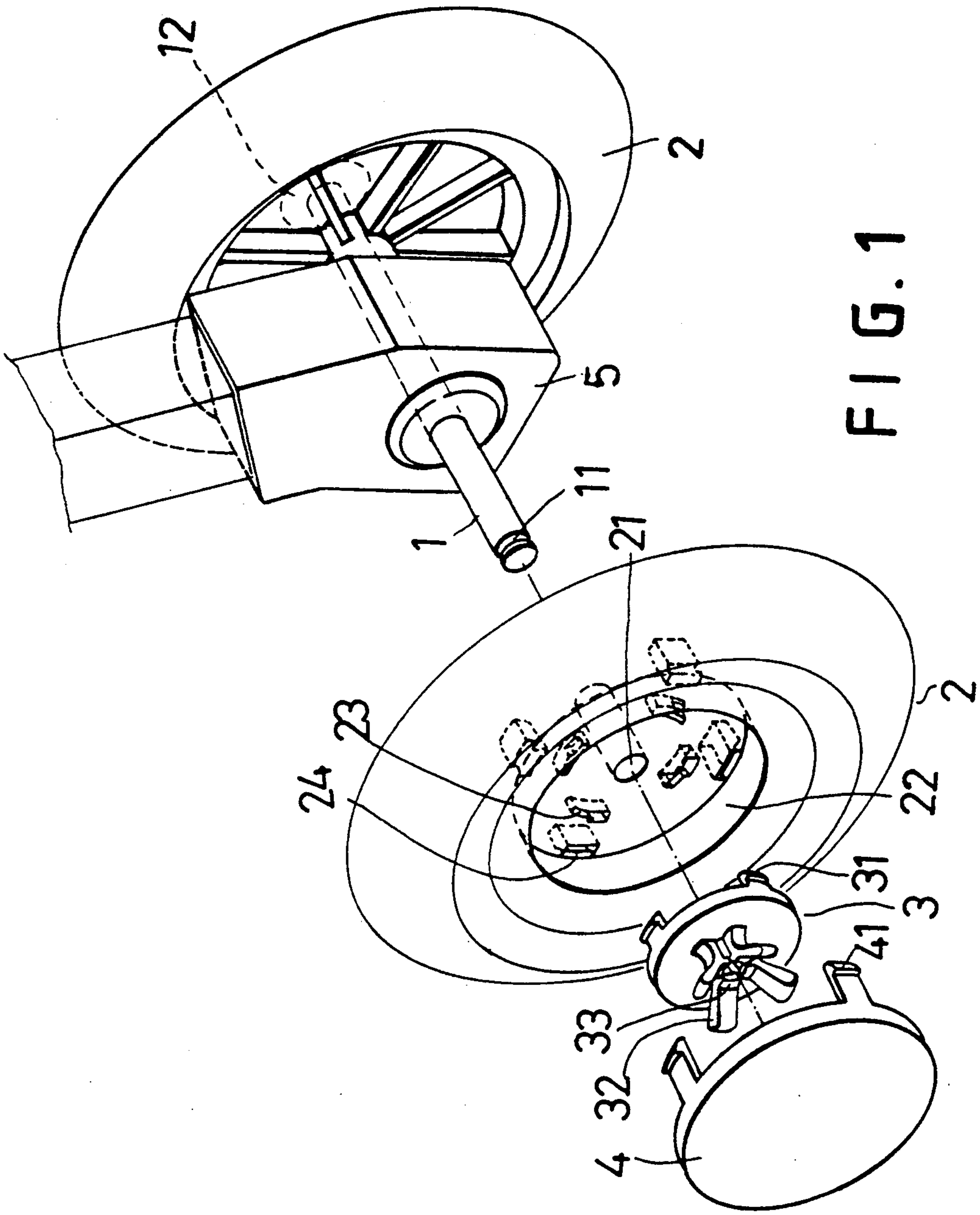
FIG. 1 is an exploded perspective view of a wheel assembly for a baby carriage showing the subject invention concept.

Referring now to FIG. 1, there is shown a wheel assembly for a baby carriage which includes a shaft 1, a pair of wheels 2, a combining disc 3, a closing cap 4 and a shaft holder 5 as component elements.

The shaft 1 has an annular groove 11 formed therein near one end and a large round head 12 formed at an opposing end.

Each wheel 2, 2 has a central shaft hole 21 passing therethrough for the shaft 1 to pass through. Each wheel 2, 2 further includes a recessed aperture 22 formed therein at one lateral side, a plurality of grooves 23 formed in a bottom of the aperture 22 and a plurality of inserting holes 24.

The combining disc has a plurality of hooks 31 extending from a circumferential wall of one lateral side in equally spaced apart distances, a plurality of pressing studs 32 extend inclinedly from the other lateral side in an equally spaced apart distance relationship, and a small projection on each pressing stud 32 is provided to engage the annular groove 11 formed in the shaft 1.

The closing cap 4 has a plurality of hooks 41 extending therefrom as shown to engage the inserting holes 24 in the wheel 2.

The shaft holder 5 located between wheels 2, 2' is coupled to the shaft 1 and is fixed at a bottom end of a supporting rod of a baby carriage.

Figure 2:
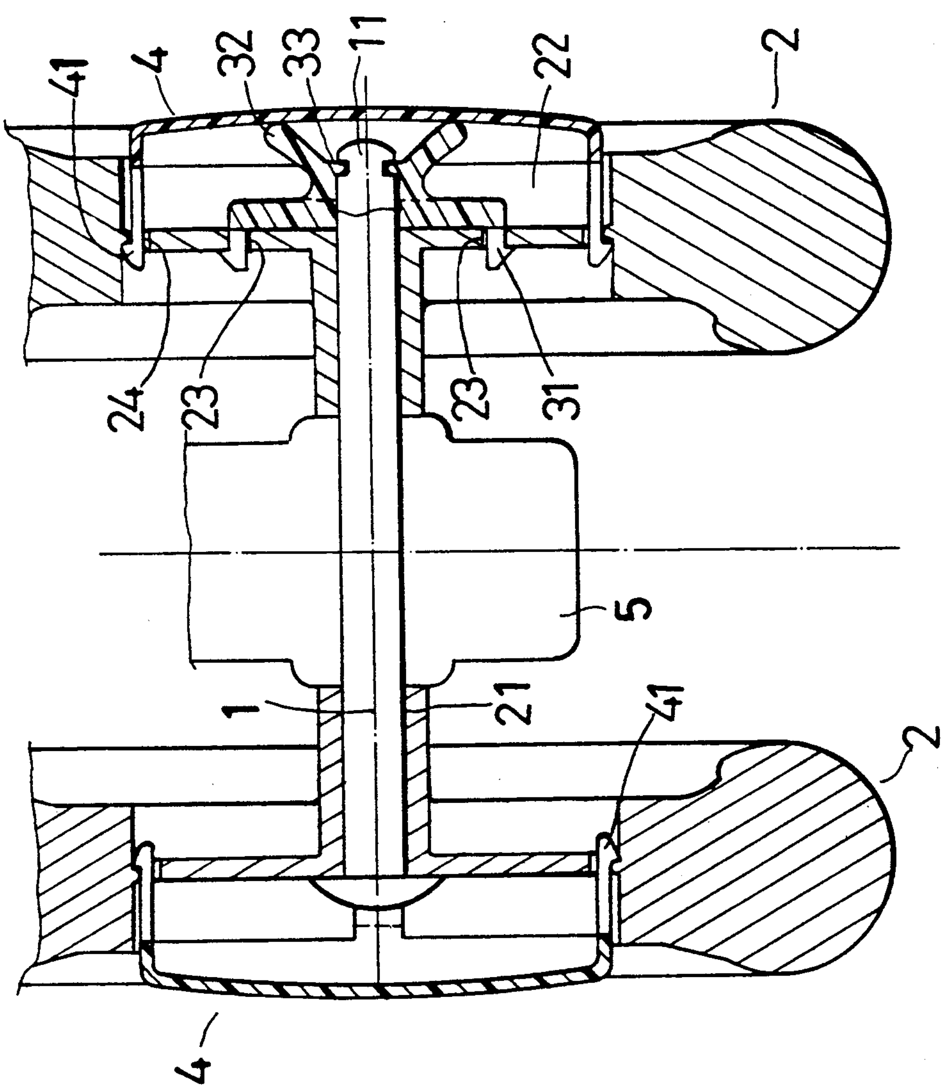
FIG. 2 is a cross-sectional view of the wheel assembly for a baby carriage of the present invention.
Figure 4:
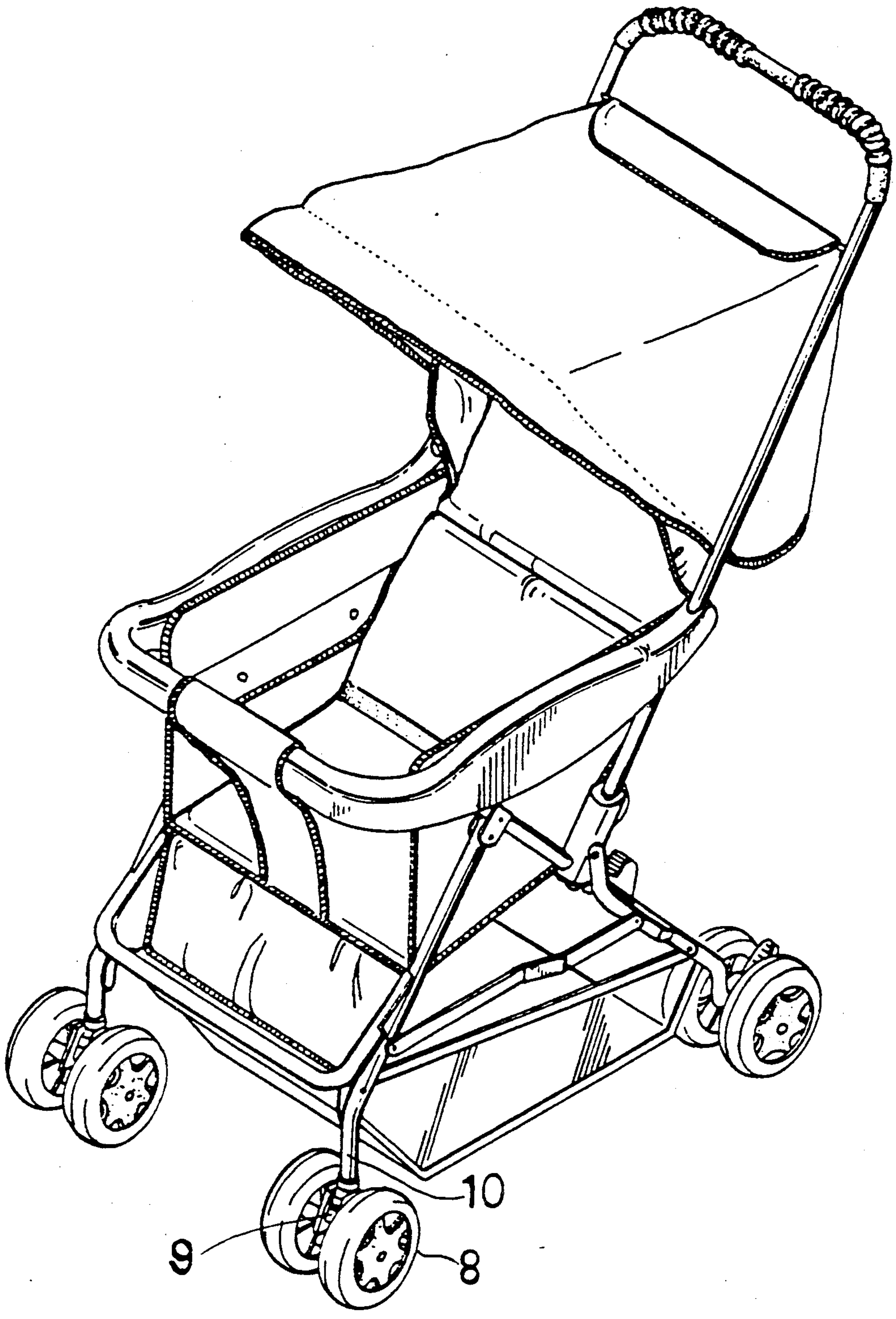
FIG. 4 is a perspective view of a prior art baby carriage.
Figure 6:
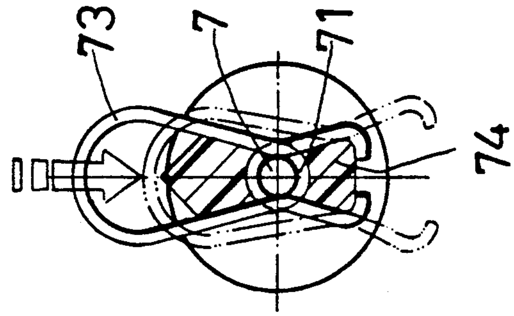
Figure 5:
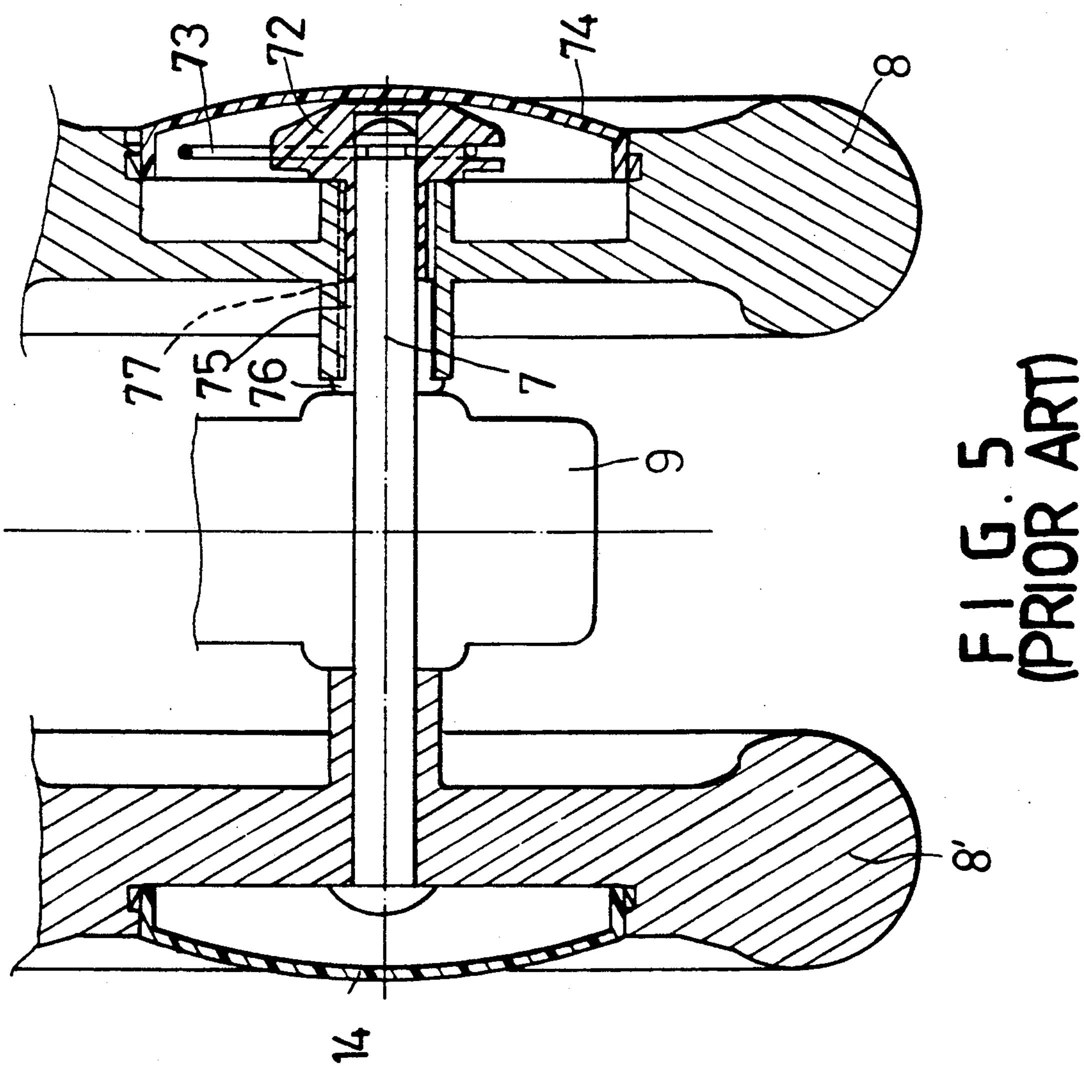
FIG. 5 is a cross-sectional view of a wheel assembly of a prior art baby carriage shown in FIG. 4; and, FIG. 6 is a cross-sectional view of the wheel assembly in a prior art baby carriage showing the disassembling process.

In assembly, as shown in FIGS. 1 and 2, the shaft 1 is inserted through one wheel 2, the shaft holder 5, another wheel 2, and then the combining disc 3, allowing the small projections 33 to engage within the annular groove 11 of the shaft so that the shaft 1 can combine with the two wheels 2, 2 at both sides of the shaft holder 5. Subsequently, the two closing caps 4 are mounted on the recessed apertures 22, 22 of the two wheels 2, 2, with the tops of the pressing studs 33 lightly touching or contiguous to the inner surface of the closing cap.

Figure 3:
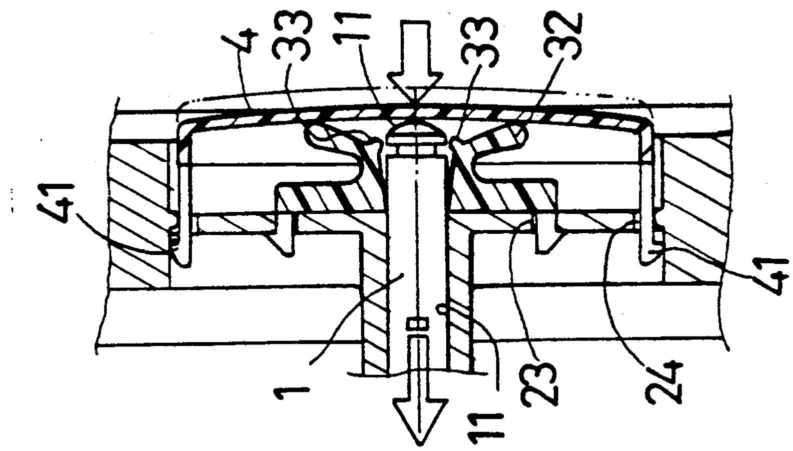
FIG. 3 is a cross-sectional view showing the movement of the wheel assembly for a baby carriage after its cap is displaced.

FIG. 3 shows how the wheel assembly is disassembled. First, the closing cap 4 at the right side is pressed inwardly compressing the pressing studs 32 to bend down or be displaced which releases the small projections 33 from the annular groove 11. Once this is done, the wheel 2 at the right side can be easily removed from the shaft 1. The hooks 41 of the closing cap 4 are released from the inserting holes 24, and the closing cap 4 may be removed from the wheel 2. When the hooks 31 are released from the grooves 23, the combining disc 3 can be separated from the wheel 2.

While the preferred embodiments of the invention have been described above, it will be recognized and understood that various modifications may be made therein and the appended claims are intended to cover all such modifications which may fall within the spirit and scope of the invention.

What is claimed is:

1. A wheel assembly for a baby carriage comprising:

a shaft holder for supporting a shaft rotationally mounted therein, said shaft holder being combined with a bottom end of a sustaining rod of a baby carriage;

said shaft being supported by the shaft holder and having an annular groove formed at one end which receives a plurality of small projections of pressing studs integral with a combining disc to fit therein for connecting the shaft with the combining disc and the shaft having a large round head at the other end;

two wheels respectively having a central shaft hole for the shaft to pass through, each of said wheels having a recessed aperture at an external lateral side, a plurality of grooves equally spaced around in a bottom of at least one of the recessed apertures, a plurality of inserting holes equally spaced apart in the bottom of the recessed apertures;

the combining disc having a plurality of hooks extending from a circumference of an inner lateral side in an equally spaced distance to engage the plurality of grooves, the plurality of pressing studs extending inclinedly from an outer lateral side in an equally spaced distance, each pressing stud having a small projection to fit in the annular groove of the shaft;

two caps covering the recessed apertures of the two wheels respectively, having a plurality of inwardly extending hooks equally spaced apart on an inner lateral side to engage the inserting holes in the recessed aperture; and said shaft inserted through the two wheels, the shaft holder and the combining disc, said small projections of the combining disc engaging the annular groove of the shaft, said closing cap hooks engaging the inserting holes to cover the recessed aperture, said pressing studs lightly engaging an inner surface of the closing cap, said pressing studs compressed inward when the closing cap is pressed inward, said inward compression bending the pressing studs so as to disengage the small projections from the annular groove and thereafter allow wheel removal.

* * * * *